(12) United States Patent
Dey et al.

(10) Patent No.: US 12,147,915 B2
(45) Date of Patent: Nov. 19, 2024

(54) SYSTEMS AND METHODS FOR MODELLING PREDICTION ERRORS IN PATH-LEARNING OF AN AUTONOMOUS LEARNING AGENT

(71) Applicant: Tata Consultancy Services Limited, Mumbai (IN)

(72) Inventors: Sounak Dey, Kolkata (IN); Sakyajit Bhattacharya, Kolkata (IN); Kaustab Pal, Kolkata (IN); Arijit Mukherjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 716 days.

(21) Appl. No.: 16/547,380

(22) Filed: Aug. 21, 2019

(65) Prior Publication Data

US 2020/0151599 A1    May 14, 2020

(30) Foreign Application Priority Data

Aug. 21, 2018  (IN) ............................. 201821031249

(51) Int. Cl.
| | |
|---|---|
| *G06N 7/01* | (2023.01) |
| *G06N 3/049* | (2023.01) |
| *G06N 3/08* | (2023.01) |

(52) U.S. Cl.
CPC .............. *G06N 7/01* (2023.01); *G06N 3/049* (2013.01); *G06N 3/08* (2013.01)

(58) Field of Classification Search
None
See application file for complete search history.

(56) References Cited

U.S. PATENT DOCUMENTS

| | | |
|---|---|---|
| 2008/0167820 A1 | 7/2008 | Oguchi et al. |
| 2016/0028599 A1 | 1/2016 | Vasseur et al. |
| (Continued) | | |

FOREIGN PATENT DOCUMENTS

CN            107103613 A    *  8/2017

OTHER PUBLICATIONS

Zhang, Xinzheng, Jianfen Zhang, and Junpei Zhong. "Toward navigation ability for autonomous mobile robots with learning from demonstration paradigm: A view of hierarchical temporal memory." International Journal of Advanced Robotic Systems 15.3 (2018): 1729881418777939. (Year: 2018).*

(Continued)

*Primary Examiner* — Omar F Fernandez Rivas
*Assistant Examiner* — Chaitanya R Jayakumar
(74) *Attorney, Agent, or Firm* — Finnegan, Henderson, Farabow, Garrett & Dunner, LLP

(57) ABSTRACT

Systems and methods for modelling prediction errors in path-learning of an autonomous learning agent are provided. The traditional systems and methods provide for machine learning techniques, wherein estimation of errors in prediction is reduced with an increase in the number of path-iterations of the autonomous learning agent. Embodiments of the present disclosure provide for a two-stage modelling technique to model the prediction errors in the path-learning of the autonomous learning agent, wherein the two-stage modelling technique comprises extracting a plurality of fitted error values corresponding to a plurality of predicted actions and actual actions by implementing an Autoregressive moving average (ARMA) technique on a set of prediction error values; and estimating, by implementing a linear regression technique on the plurality of fitted error values, a probable deviation of the autonomous learning agent from (Continued)

each of an actual action amongst a plurality of predicted and actual actions.

3 Claims, 11 Drawing Sheets

(56) References Cited

U.S. PATENT DOCUMENTS

2016/0132787 A1* 5/2016 Drevo .................... G06N 20/10 706/12
2018/0053093 A1* 2/2018 Olabiyi ................. B60W 40/09

OTHER PUBLICATIONS

Taghvaei, Sajjad, Mohammad Hasan Jahanandish, and Kazuhiro Kosuge. "Autoregressive-moving-average hidden Markov model for vision-based fall prediction—An application for walker robot." Assistive technology 29.1 (2017): 19-27. (Year: 2017).*

Reyes, Fernando, and Rafael Kelly. "Experimental evaluation of identification schemes on a direct drive robot." Robotica 15.5 (1997): 563-571. (Year: 1997).*

Zhang, Xinzheng, Jianfen Zhang, and Junpei Zhong. "Skill learning for intelligent robot by perception-action integration: A view from hierarchical temporal memory." Complexity 2017 (2017). (Year: 2017).*

Liddiard, Ashley, Jonathan Tapson, and Robyn Verrinder. "A robust implementation of the spatial pooler within the theory of Hierarchical Temporal Memory (HTM)." 2013 6th Robotics and Mechatronics Conference (RobMech). IEEE, 2013. (Year: 2013).*

Lin, Jessica, et al. "Iterative incremental clustering of time series." Advances in Database Technology—EDBT 2004: 9th International Conference on Extending Database Technology, Heraklion, Crete, Greece, Mar. 14-18, 2004 9. Springer Berlin Heidelberg, 2004. (Year: 2004).*

Cui, Y. et al. (Apr. 2016). "Continuous online sequence learning with an unsupervised neural network model," Journal Neural Computation, vol. 28, No. 11; pp. 2474-2504.

Pedretti, G. et al. (Jul. 2017). "Memristive neural network for on-line learning and tracking with brain-inspired spike timing dependent plasticity," *Scientific Reports*, vol. 7, issue 5288; pp. 1-10.

* cited by examiner

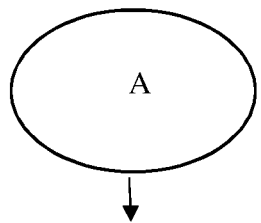

Modelling, based upon the set of prediction error values, a plurality of prediction errors in path-learning of the autonomous learning agent, wherein the modelling comprises: (i) extracting, from the set of prediction error values, a plurality of fitted error values corresponding to each of the plurality of predicted actions and actual actions by implementing an Autoregressive moving average (ARMA) technique on the set of prediction error values; and (ii) estimating, by implementing a linear regression technique on the plurality of fitted error values, a probable deviation of the autonomous learning agent from each of the actual action amongst the plurality of predicted and actual actions — 204

FIG. 2B

Input Iterations in Square path

Input Iterations in Crisscross path

SYSTEMS AND METHODS FOR MODELLING PREDICTION ERRORS IN PATH-LEARNING OF AN AUTONOMOUS LEARNING AGENT

PRIORITY CLAIM

This U.S. patent application claims priority under 35 U.S.C. § 119 to: India Application No. 201821031249, filed on Aug. 21, 2018. The entire contents of the aforementioned application are incorporated herein by reference.

TECHNICAL FIELD

The disclosure herein generally relates to modelling prediction errors in path-learning of an autonomous learning agent, and, more particularly, to systems and methods for modelling prediction errors in path-learning of an autonomous learning agent.

BACKGROUND

Self-learning predictive systems are systems which have the capability to learn sequences of actions and use any inherent patterns present therein to correctly predict future courses of actions. Such systems may be used for self-learning robots which may need to interact with humans, especially in factory or residential settings and autonomous cars who will need to anticipate events on the road for successful navigation. Various deep learning and reinforcement learning techniques are currently used for this purpose (for example, temporal skipping) but such techniques need a large volume of training data and computational resources; moreover they are not capable of online learning. In robotics, this genre of learning and prediction techniques work well in controlled environments but a more adaptive learning and prediction technique by repeated trial and error, similar to human brain, may be required for autonomous operations within unstructured and noisy environments.

Hierarchical Temporal Memory (HTM) comprises creating a biologically inspired (and constrained) theoretical framework capable of human brain-like learning and prediction wherein incoming environmental stimulus is encoded in Sparse Distributed Representation (SDR) format. A cortical learning algorithm mimicking the human brain is applied, which by using temporal and spatial clustering, probabilistically abstracts the SDR representation to detect semantic similarity among consecutive such SDRs. Finally, a learning and prediction model, very similar to human brain is created, which can store, learn, infer and recall higher order sequences. The HTM works accurately as demonstrated in various applications such as monitoring and predicting stock performance, energy usage, machine failure, detecting unusual human behavior and finding patterns in geospatial data and even human-like skill learning for robots.

Though the performance of traditional systems and methods, such as the HTM is satisfying in certain scenarios, the traditional systems and methods are essentially a simple theoretical modelling framework, wherein with an increase in iterations of the self-learnings systems, learning and predictions become inaccurate.

SUMMARY

Embodiments of the present disclosure present technological improvements as solutions to one or more of the above-mentioned technical problems recognized by the inventors in conventional systems. For example, in one embodiment, a method for modelling prediction errors in path-learning of an autonomous learning agent is provided, the method comprising: capturing, by one or more hardware processors, a plurality of sequential actions depicting a pattern of time series via a two-stage modelling technique, wherein each of the plurality of sequential actions corresponds to the autonomous learning agent; deriving, based upon the plurality of sequential actions captured, one or more datasets comprising a plurality of predicted and actual actions of the autonomous learning agent by a Hierarchical Temporal Memory (HTM) modelling technique; extracting, using each of the plurality of predicted and actual actions, a set of prediction error values by a Euclidean Distance technique, wherein each of the set of prediction error values comprises a deviation from one or more actual actions amongst the plurality of predicted and actual actions; modelling, based upon the set of prediction error values, a plurality of prediction errors in path-learning of the autonomous learning agent, wherein the modelling comprises: (i) extracting, from the set of prediction error values, a plurality of fitted error values corresponding to each of the plurality of predicted actions and actual actions by implementing an Autoregressive moving average (ARMA) technique on the set of prediction error values; and (ii) estimating, by implementing a linear regression technique on the plurality of fitted error values, a probable deviation of the autonomous learning agent from each of an actual action amongst the plurality of predicted and actual actions; integrating the two-stage time series models via the linear regression technique for estimating the probable deviation of the autonomous learning agent; implementing the two-stage modelling technique to capture a plurality of learning modalities across the path-learning of the autonomous learning agent, wherein the plurality of learning modalities comprise a learning from a preceding step and a learning from a preceding iteration by the autonomous learning agent.

In another aspect, there is provided a system for modelling prediction errors in path-learning of an autonomous learning agent, the system comprising a memory storing instructions; one or more communication interfaces; and one or more hardware processors coupled to the memory via the one or more communication interfaces, wherein the one or more hardware processors are configured by the instructions to: capture, a plurality of sequential actions depicting a pattern of time series via a two-stage modelling technique, wherein each of the plurality of sequential actions corresponds to the autonomous learning agent; derive, based upon the plurality of sequential actions captured, one or more datasets comprising a plurality of predicted and actual actions of the autonomous learning agent by a Hierarchical Temporal Memory modelling (HTM) technique; extract, using each of the plurality of predicted and actual actions, a set of prediction error values by a Euclidean Distance technique, wherein each of the set of prediction error values comprises a deviation from one or more actual actions amongst the plurality of predicted and actual actions; model, based upon the set of prediction error values, a plurality of prediction errors in path-learning of the autonomous learning agent, wherein the modelling comprises: (i) extract, from the set of prediction error values, a plurality of fitted error values corresponding to each of the plurality of predicted actions and actual actions by implementing an Autoregressive moving average (ARMA) technique on the set of prediction error values; and (ii) estimate, by implementing a linear regression technique on the plurality of fitted error values, a probable deviation of the autonomous learning agent from each of an actual action amongst the plurality of predicted and actual actions; integrate the two-stage time series models via the linear regression technique for estimating the probable deviation of the autonomous learning agent; implement the two-stage modelling technique to capture a plurality of learning modalities across the path-learning of the autonomous learning agent, wherein the plurality of learning modalities comprise a learning from a preceding step and a learning from a preceding iteration by the autonomous learning agent.

In yet another aspect, there is provided one or more non-transitory machine readable information storage mediums comprising one or more instructions which when executed by one or more hardware processors causes the one or more hardware processors to perform a method for modelling prediction errors in path-learning of an autonomous learning agent, the method comprising: capturing, by the one or more hardware processors, a plurality of sequential actions depicting a pattern of time series via a two-stage modelling technique, wherein each of the plurality of sequential actions corresponds to the autonomous learning agent; deriving, based upon the plurality of sequential actions captured, one or more datasets comprising a plurality of predicted and actual actions of the autonomous learning agent by a Hierarchical Temporal Memory (HTM) modelling technique; extracting, using each of the plurality of predicted and actual actions, a set of prediction error values by a Euclidean Distance technique, wherein each of the set of prediction error values comprises a deviation from one or more actual actions amongst the plurality of predicted and actual actions; modelling, based upon the set of prediction error values, a plurality of prediction errors in path-learning of the autonomous learning agent, wherein the modelling comprises: (i) extracting, from the set of prediction error values, a plurality of fitted error values corresponding to each of the plurality of predicted actions and actual actions by implementing an Autoregressive moving average (ARMA) technique on the set of prediction error values; and (ii) estimating, by implementing a linear regression technique on the plurality of fitted error values, a probable deviation of the autonomous learning agent from each of an actual action amongst the plurality of predicted and actual actions; integrating the two-stage time series models via the linear regression technique for estimating the probable deviation of the autonomous learning agent; implementing the two-stage modelling technique to capture a plurality of learning modalities across the path-learning of the autonomous learning agent, wherein the plurality of learning modalities comprise a learning from a preceding step and a learning from a preceding iteration by the autonomous learning agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A through 2B is a flow diagram illustrating the steps involved in the process of modelling the prediction errors in path-learning of the autonomous learning agent, in accordance with some embodiments of the present disclosure.

DETAILED DESCRIPTION

Figure 1:
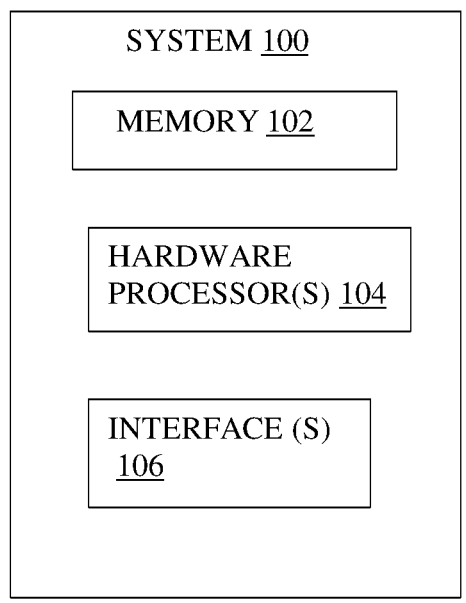
FIG. 1 illustrates a block diagram of a system for modelling prediction errors in path-learning of an autonomous learning agent, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for modelling prediction errors in path-learning of an autonomous learning agent. Neocortex, the wrinkled portion of brain comprises a predictive memory system that stores sensory perception and motor actions and is capable of learning/inferring, decision making, generation of commands and spatial reasoning based on the knowledge acquired and stored over time. Self-learning systems, such as a Hierarchical Temporal Memory (HTM) is a theoretical framework based on the understanding of human neocortex. Predictive modelling generally refers to techniques for extracting information from data to build a model that can predict an output from a given input. Predicting an output can include predicting future trends or behavior patterns, or performing sentiment analysis, to name a few examples.

Various types of predictive and machine learning models can be used to analyze data and generate predictive outputs. The amount of training data that can be required to train a predictive or a machine learning model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection. In some cases, output from a number of distinct predictive models can be combined to achieve a superior prediction.

Though the performance of some of the traditional systems and methods, such as the HTM is satisfying in certain scenarios for the predictive modelling, the traditional systems and methods are essentially a simple theoretical modelling framework lacking mathematical formulations in their learning and framework.

Hence, there is a need for a technology that provides for a framework (or a mathematical framework) to model the prediction behavior of such machine learning models, thereby providing for an accurate predictive modelling as the number of iterations in learning of autonomous learning agents increase, and the framework is able to accommodate both learning modalities, that is, when the autonomous learning agent learns within each of the path-iteration and across each of the path-iterations.

Referring now to the drawings, and more particularly to FIG. 1 through 8C, where similar reference characters denote corresponding features consistently throughout the figures, there are shown preferred embodiments and these embodiments are described in the context of the following exemplary system and/or method.

FIG. 1 illustrates an exemplary block diagram of a system 100 for modelling prediction errors in path-learning of an autonomous learning agent, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2A:
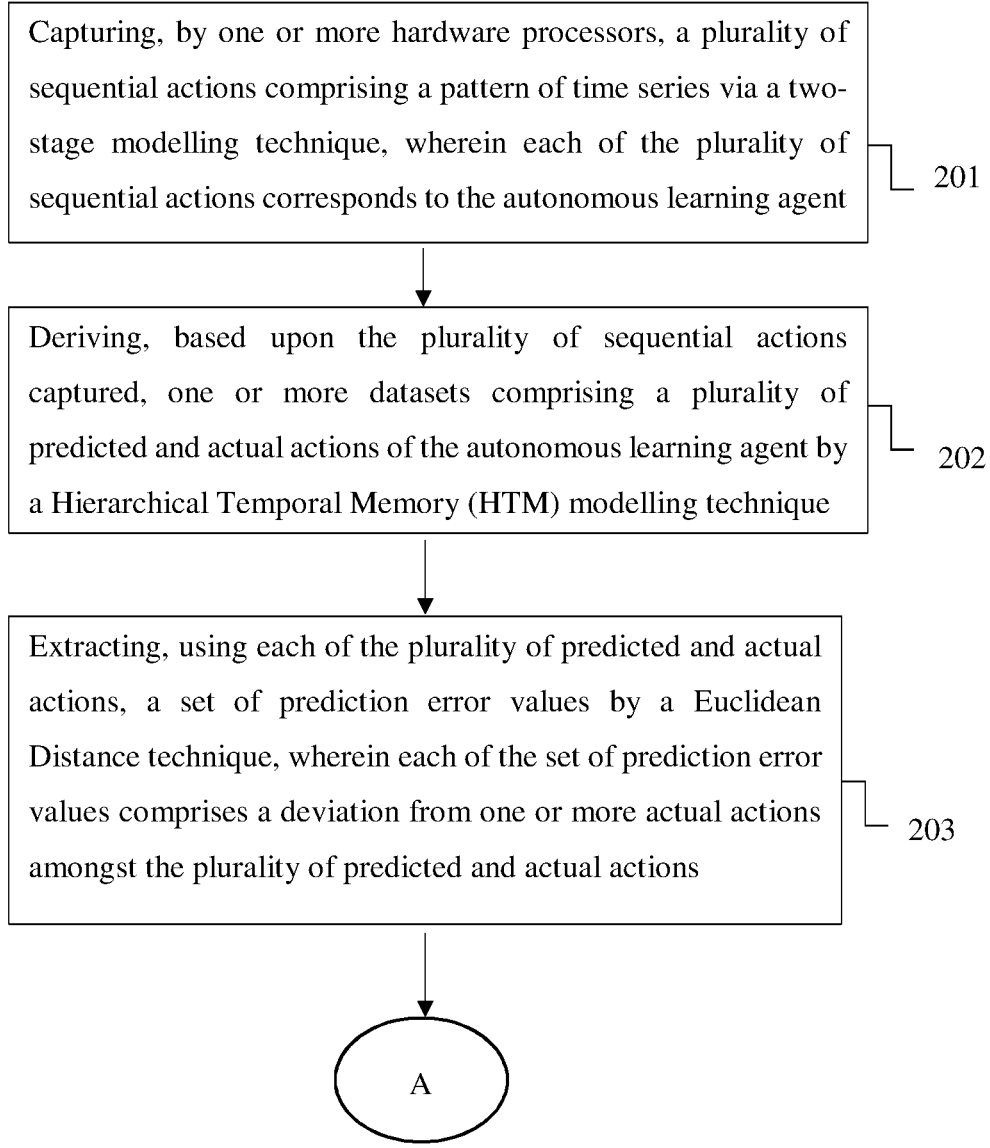

FIG. 2A through 2B, with reference to FIG. 1, illustrates an exemplary flow diagram of a method for modelling the prediction errors in path-learning of the autonomous learning agent, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 201, the one or more hardware processors 104 capture a plurality of sequential actions via a two-stage modelling technique, wherein the plurality of sequential actions depict a pattern of time series, and wherein each of the plurality of sequential actions corresponds to the autonomous learning agent. As used herein, the autonomous learning agent may comprise a smart agent operating on an owner's behalf but without any interference of that ownership entity, for example, a robot. In general, autonomous learning agent(s) possess capacity to process information within a restricted domain giving it autonomy and then take an action based upon the rules it has been given or learned. Further, the autonomous learning system may use information gathered from sensors to make independent decisions and then act on them using corresponding actuators.

The autonomous learning agent may also comprise of any Deep Learning agent or an Artificial Intelligence based agent that uses one or more deep learning techniques to perform and improve upon its tasks (for example, chat-bots, self-driving cars and the like) Generally, sequence(s) of actions executed by any autonomous learning agent facilitates execution of tasks or sub-tasks. A sequence of actions generally comprises several parallel or sequential actions. Again, an action may comprise one or several parallel or sequential elementary actions. Further, a single elementary action comprises a single or a plurality of parallel elementary operations. Each of the plurality of parallel elementary operations characterizes a primitive senso-motoric operation for degree of freedom (DOF) of the robot subsystem (for e.g. one low-level control loop).

In an embodiment, the plurality of sequential actions may comprise turning left, right, moving forward etc. by the autonomous learning agent, wherein the plurality of sequential actions are represented by a sequence for execution of tasks or sub-tasks. Further, the plurality of sequential actions depict the pattern of time series as learning and prediction of the autonomous learning agent evolves and become accurate over time. The plurality of sequential actions are captured via the two-stage modelling technique. The two-stage modelling technique may now be considered in detail.

In an embodiment, the two-stage modelling technique comprises a model (or a mathematical model) that may be described via two-stage model to analyze any deviation(s) in learning using a Hierarchical Temporal Memory (HTM) or a HTM modelling technique. As is known in the art, the HTM (or the HTM modelling technique) is a theoretical framework based on the understanding of human neocortex. The HTM is based on the hypothesis that a common set of learning algorithms reside within the neocortex (validated by the experiments on neo-natal ferrets whose auditory cortex was rewired with the vision system). The HTM may be viewed as a type of neural network, although, the structure is radically different from conventional ANNs where feedback and feed-forward inputs are not really considered.

The HTM (or the HTM modelling technique) models neurons (or cells, in its terminology) which are arranged in columns and regions, forming a hierarchy analogous to the cortical structure of human brain. The HTM, fundamentally, is a memory-based system, and an HTM network, when trained on time-varying data, stores a large set of patterns and sequences. HTM memory, on the other hand, is restricted with a hierarchical organization and inherent reliance on time. Information is stored in a distributed manner, and the HTM controls where and how information is stored based on the size of the hierarchy and the type of data.

In an embodiment, the two-stage modelling technique comprises a time series model within each path-iteration of the path-learning and another time series model across all path-iterations of the path-learning, wherein the two-stage time series models (that is, the time series model within each path-iteration and the another time series model across all path-iterations) are integrated via a linear regression technique for estimating a deviation of the autonomous learning agent. The implementation of the two-stage modelling technique along with examples will be discussed in further detail in subsequent paragraphs.

According to an embodiment of the present disclosure, at step 202, the one or more hardware processors 104 derive, based upon the plurality of sequential actions captured, one or more datasets comprising a plurality of predicted and actual actions of the autonomous learning agent, wherein the one or more datasets are derived by implementing the HTM modelling technique. In an embodiment, initially, the autonomous learning agent is assigned to learn a particular path comprising the plurality of sequential actions like turning left, right, moving forward etc. and as discussed in the step 201 above, the plurality of sequential actions are captured.

An actual action refers to an actual step taken by the autonomous learning agent, wherein each such actual action amongst the plurality of predicted and actual actions results in a movement of the autonomous learning agent to a position on the path which is denoted by $(x_{act}, y_{act})$. Similarly, a predicted action refers to an action of a robot predicted by the HTM modelling technique. Each of a prediction action amongst the plurality of predicted and actual actions is supposed to take the autonomous learning agent to a position in the path denoted by $(x_{pred}, y_{pred})$.

If a path comprises n steps and if p iterations are required to precisely learn and predict the path, learning and prediction at $i^{th}$ step in $j^{th}$ path-iteration is influenced by an action taken in all (n−1) preceding steps in that path-iteration, and by an action taken in the exact $i^{th}$ step in all preceding (j−1) path-iterations. Referring to Table 1 below, a sample dataset derived by implementing the HTM framework (or the HTM modelling technique) may be referred, wherein prediction position of the autonomous learning agent is denoted by $(x_{pred}, y_{pred})$, while an actual position is denoted by $(x_{act}, y_{act})$.

TABLE 1

| $X_{act}$ | $Y_{act}$ | $X_{pred}$ | $Y_{pred}$ | . | . | $X_{act}$ | $Y_{act}$ | $X_{pred}$ | $Y_{pred}$ |
|---|---|---|---|---|---|---|---|---|---|
| $X_{act_{11}}$ | $Y_{act_{11}}$ | $X_{pred_{11}}$ | $Y_{pred_{11}}$ | . | . | $X_{act_{1p}}$ | $Y_{act_{1p}}$ | $X_{pred_{1p}}$ | $Y_{pred_{1p}}$ |
| $X_{act_{21}}$ | $Y_{act_{21}}$ | $X_{pred_{21}}$ | $Y_{pred_{21}}$ | . | . | $X_{act_{2p}}$ | $Y_{act_{2p}}$ | $X_{Xpred_{2p}}$ | $Y_{pred_{2p}}$ |
| $X_{act_{31}}$ | $Y_{act_{31}}$ | $X_{pred_{31}}$ | $Y_{pred_{31}}$ | . | . | $X_{act_{3p}}$ | $Y_{act_{3p}}$ | $X_{Xpred_{3p}}$ | $Y_{pred_{3p}}$ |
| . | . | . | . | | | . | . | . | . |
| . | . | . | . | | | . | . | . | . |
| $X_{act_{n1}}$ | $Y_{act_{n1}}$ | $X_{pred_{n1}}$ | $Y_{pred_{n1}}$ | . | . | $X_{act_{np}}$ | $Y_{act_{np}}$ | $X_{Xpred_{np}}$ | $Y_{pred_{np}}$ |

In an embodiment, the autonomous learning agent while traversing a path, learns in two different ways. One learning is achieved within a path, that is, when the autonomous learning agent learns from one or more preceding steps in the path. Another learning may be achieved across each path-iteration, that is, when the autonomous learning agent learns from one or more preceding-iterations.

Suppose, the autonomous learning agent takes n steps to complete a path-iteration. Further, p path-iterations are taken to complete learning of that path. Then $e_{ij}$ may denote a deviation (of the autonomous learning agent) from an actual position at $j^{th}$ step of $i^{th}$ path-iteration. Thus, as discussed above, learning is achieved in two ways, that is, $e_{ij}$ is achieved based upon learning from $e_{j.}$, and also based upon learning from $e_{.j}$, wherein $e_{i.}=\{e_i 1, e_i 2, \ldots, e_i, j-1\}$, and $e_{.j}=\{e_{1j}, e_{2j}, \ldots, e_{i-1}, j\}$. In other words, if the autonomous learning agent is at third step of fifth path-iteration, the autonomous learning agent has learnt from the first and second steps of the fifth path-iteration, and also from the third step of preceding four path-iterations.

Figure 3:
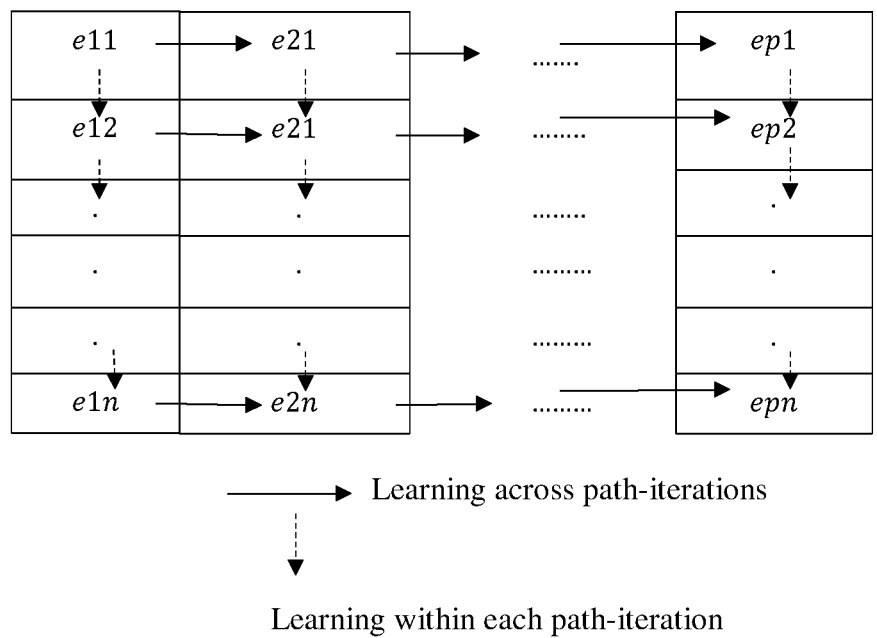
FIG. 3 illustrates learning of the autonomous learning agent within each path-iteration and across each path-iteration, and an example of a path and a path-iteration of the autonomous learning agent, in accordance with some embodiments of the present disclosure.

Referring to FIG. 3, an example of a path and a path-iteration of the autonomous learning agent may also be referred. Referring to FIG. 3 again, learning within each path-iteration and across each path-iteration may be referred.

According to an embodiment of the present disclosure, at step 203, the one or more hardware processors 104 extract a set of prediction error values by a Euclidean Distance technique using each of the plurality of predicted and actual actions, wherein each of the set of prediction error values comprises a deviation from one or more actual actions amongst the plurality of predicted and actual actions. In an embodiment, if a prediction position of the autonomous learning agent is denoted by $(x_{pred}, y_{pred})$, while an actual position is denoted by $(x_{act}, y_{act})$, the Euclidean Distance may be derived between actual coordinates and predicted coordinates.

In an embodiment, the Euclidean Distance technique is applied for each of the n steps and p iterations as learning and prediction at $i^{th}$ step in $j^{th}$ path-iteration is influenced by an action taken in all (n−1) preceding steps in that path-iteration, and by an action taken in the exact $i^{th}$ step in all preceding (j−1) path-iterations. It may be noted that the embodiments of the proposed disclosure do not restrict extraction of the set of prediction error values using the Euclidean Distance technique only and facilitate extracting the set of prediction error values using some other techniques or any combination(s) of one or more known techniques. In an example, the set of prediction error values may be obtained as:

Predicted error after learning iteration 1 only for a square path=7.209276;

Predicted error after learning iterations 1 and 2 for the square path=5.613553; and Predicted error after learning iterations 1,2,3,4,5,6 and 7 for the square path=2.183144.

According to an embodiment of the present disclosure, at step 204, the one or more hardware processors 104 model, based upon the set of prediction error values, a plurality of prediction errors in path-learning of the autonomous learning agent. At step 204(i) the one or more hardware processors 104.extract, from the set of prediction error values, a plurality of fitted error values corresponding to each of the plurality of predicted actions and actual actions by implementing an Autoregressive moving average (ARMA) technique on the set of prediction error values. The step of modelling may now be considered in detail in the light of technical problems encountered by the traditional systems and methods.

Generally, learning of the autonomous learning agent evolves over time and hence a time series model is necessary to catch its behavior. However, a single time series model in such a case is always futile, as a time series comprises an autocorrelation parameter. The autocorrelation parameter measures the effect of preceding step(s) taken by the autonomous learning agent on present step(s). However, as the preceding step(s) go further back in past, the effect of the autocorrelation parameter reduces. Thus, autocorrelation may now properly capture the effect of $e_{.j}$ on $e_{ij}$ if a single time series is implemented.

In reality, the autonomous learning agent retains memory of preceding path-iteration, a single time series exhibits a futile effect, since the single time series is required to traverse the length of the entire path-iteration to reach a certain step from the same step in the preceding path-iteration. Considering an example scenario, referring to FIG. 3 yet again, $e_{22}$ may be achieved as a result of learning from the second step of the first path-iteration, and also as the first step of the second path-iteration. A single time series, with an appropriate autocorrelation results in a high influence of $e_{21}$ on $e_{22}$. However, if the autocorrelation is a single number, for example $\rho$, then correlation between $e_{22}$ and $e_{12}$ will be $\rho^\rho$, which may be very small for a large $\rho$ (since $|\rho| \leq 1$), thereby proving that a single time series fails to capture the influence across the path-iterations.

Modelling Using Two-Stage Modelling Technique—

To overcome technical limitations of the traditional systems and methods, the proposed disclosure provides for the two-stage modelling technique, wherein the two-stage modelling technique, as discussed above, comprises the time series model within each path-iteration of the path-learning and the another time series model across all path-iterations of the path-learning. The implementation of the two-stage modelling technique in modelling the prediction errors in path-learning of the autonomous learning agent along with the examples may now be considered in detail.

In an embodiment, the two-stage modelling technique uses two time series $T_1$ and $T_2$. For each step in the path-learning of the autonomous learning agent, $T_1$ is an ARMA model that learns within each of the path-iteration, and $T_2$ is another ARMA model that learns across each of the path-iteration. If $Y_t$ is an ARMA (p, q) time series with p autoregressive terms and q moving-average terms, then its corresponding mathematical expression may be given as:

$$Y_t = C + \Sigma_{i=1}^{p} \phi_i Y_{t-i} + \Sigma_{i=1}^{q} \Psi_i \varepsilon_{t-i} + \varepsilon_t \quad \text{equation (1)}$$

wherein $\varepsilon_t$ is error at time t, $\phi_i$–S are auto-regression parameters and $\Psi_i$–S are moving-average parameters.

The two-stage modelling (or the modelling) is thus performed across and within each path-iteration of the path-learning by implementing the ARMA technique. Further, the two-stage modelling technique is implemented to capture a plurality of learning modalities across the path-learning of the autonomous learning agent, wherein the plurality of learning modalities comprise a learning from a preceding step and a learning from a preceding iteration by the autonomous learning agent.

The proposed disclosure makes an assumption that each path-iteration may be modelled by a single ARMA($p_1$, $q_1$) time series $T_1$, and each of the steps across the path-iterations may be modelled by implementing a single ARMA($p_2$, $q_2$) time series $T_1$. After fitting the time-series models $T_1$ and $T_2$, a prediction corresponding to each value may be obtained. In an embodiment, for each value two predictions, for example, $\hat{e}_{ij}$ from $T_1$ and $\tilde{e}_{ij}$ from $T_2$ may be obtained (herein referred to as the plurality of fitted error values). In an example implementation, the plurality of fitted error values may be extracted by implementing the ARMA technique as:

Fitted error values of each step within each iteration:
    Fitted error value for step 1 iteration 1=59.94000004
    Fitted error value for step 2 iteration 1=65.43371336
        Fitted error value for step 6 iteration 9=−410.931
            Fitted error value for step 9 iteration 9=−480
Fitted error values of a single step across each iteration:
    Fitted error value for iteration 1 step 1=59.94000035
        Fitted error value for iteration 1 step 6=56.75596
        Fitted error value for iteration 5 step 1=−510.62
        Fitted error value for iteration 9 step 11=−35.3545

According to an embodiment of the present disclosure, at step 204(ii), the one or more hardware processors 104, estimate, by implementing the linear regression technique on the plurality of fitted error values, a probable deviation of the autonomous learning agent from each of an actual action amongst the plurality of predicted and actual actions. Thus, upon obtaining, $\hat{e}_{ij}$ from $T_1$ and $\tilde{e}_{ij}$ from $T_2$, the two-stage modelling technique movies into a regression stage, wherein it is assumed that the autonomous learning agent's deviation from an actual position $e_{ij}$ may be modelled by the linear regression technique, wherein $\hat{e}_{ij}$ and $\tilde{e}_{ij}$ act as covariates. Represented mathematically as:

$$e_{ij} = \beta_1 \hat{e}_{ij} + \beta_2 \tilde{e}_{ij} + e_{ij} \quad \text{equation (2)}$$

wherein $\beta_1$ and $\beta_2$ are regression parameters $\varepsilon_{ij}$ is the Gaussian noise. Thus, the entire two-stage model may be mathematically represented as:

$$e_{ij} = C + \beta_1 [\Sigma_{k=1}^{p1} \hat{\phi}_k^1 e_{i-k,j} + \Sigma_{k=1}^{q1} \hat{\Psi}_i^1 \varepsilon_{i-k,.}^1 ] + \beta_2 [\Sigma_{k=1}^{p2} \hat{\phi}_k^2 e_{i,j-k} + \Sigma_{k=1}^{q2} \hat{\Psi}_i^2 \varepsilon_{.,j-k}^2 ] + \varepsilon_{ij} \quad \text{equation (3)}$$

wherein $\hat{\phi}^1$ and $\hat{\phi}^2$ denote the estimated autoregressive parameters of $T_1$ and $T_2$ respectively, and $\hat{\Psi}^1$ and $\hat{\Psi}^2$ denote the estimated moving-average parameters of $T_1$ and $T_2$ respectively. Similarly, $\varepsilon^1$ and $\varepsilon^2$ are errors attached to $T_1$ and $T_2$ respectively, while $\varepsilon$ is the Gaussian noise with mean 0 and variance 1.

Thus, for modelling the prediction errors in the path-learning, the two-stage modelling technique is implemented on the set of prediction error values extracted in step 203 above by implementing the below mentioned model (that is an algorithm) of behavior of the autonomous learning agent via the one or more hardware processors 104. Referring to the algorithm below, it may be noted that the proposed disclosure provides for fitting the two-series model for each deviation value to get two predictions, and then derive a final prediction using the linear regression over the two prediction via the one or more hardware processors 104.

Model of the Behavior of the Autonomous Learning Agent

1. Denote actual coordinates as ($X_{act}$, $Y_{act}$) and predicted coordinates as:
($X_{pred}$, $Y_{pred}$) for the autonomous learning agent;
2. Deviation $\xi = \sqrt{(x_{act}^2 + y_{act}^2) - (x_{pred}^2 + y_{pred}^2)}$;
3. List $\xi$ for each step;
4. Fit ARMA time series $T_1$ to $\xi$ within the path-iterations;
5. Fit ARMA time series $T_2$ to $\xi$ for each step across the path-iterations;
6. derive two predictions for $\xi$ for each step, $\hat{\xi}$ using $T_1$ and $\tilde{\xi}$ using $T_2$;
7. Implement linear regression $\xi = C + \beta_1 \hat{\xi} + \beta_2 \tilde{\xi} + \varepsilon$; and
8. Predict final estimates $\hat{\xi}_{fin}$ using regression estimates.

The implementation of the two-stage modelling technique (explained above) to extract the plurality of fitted error values by the ARMA technique may now be considered in detail. In an embodiment, the deviation of the autonomous learning agent from its actual position is denoted by $\xi=\{\xi_{ij}\}$. The fitted deviation referred to in the above algorithm may be denoted as $\hat{\xi}_{fin}$. In an embodiment, to study the behavior of $\hat{\xi}_{fin}$, notations used in equation 3 above may be used. It may be noted that while the autonomous learning agent is trained, learning gets more accurate over a time. In other words, $\xi$ becomes equal to 0 as the time increases.

Thus, for both $T_1$ and $T_2$ the predicted values also become equal to 0 over a time. If further notations $\hat{\xi}=\{\hat{\xi}_{ij}\}$, $\check{\xi}=\{\check{\xi}_{ij}\}$, $\bar{\xi}=\{\bar{\xi}_{ij}\}$, and $\beta=\{\beta_1, \beta_2\}$ are made, the regression equation may be denoted as equation (4) below:

$$\xi = \beta\bar{\xi} + \varepsilon \quad \text{equation (4)}$$

wherein $\bar{\xi}=(\hat{\xi}, \check{\xi})$.

Based upon the regression equation (4) and $\bar{\xi}=(\hat{\xi}, \check{\xi})$ the following theorem may be obtained. If $np\to\infty$, then $\hat{\xi}_{fin}$ is approximately distributed as $N(0, \Gamma)$, wherein the method of moment estimate of $\Gamma$ is $$\hat{\beta}^T \begin{pmatrix} \Gamma_1^{-1}/n \\ \Gamma_2^{-1}/p \end{pmatrix} \hat{\beta}, \text{ wherein } \Gamma_1 = \begin{pmatrix} \Gamma_{\Phi^1\Phi^1} & \Gamma_{\Phi^1\Psi^1} \\ \Gamma_{\Phi^1\Psi^1} & \Gamma_{\Psi^1\Psi^1} \end{pmatrix} \text{ and}$$

$$\Gamma_2 = \begin{pmatrix} \Gamma_{\Phi^2\Phi^2} & \Gamma_{\Phi^2\Psi^2} \\ \Gamma_{\Phi^2\Psi^2} & \Gamma_{\Psi^2\Psi^2} \end{pmatrix},$$

and wherein $\Gamma_{\Phi^1\Phi^1}$ is a $p_1 \times p_1$ matrix with its (i,j)th element as $\gamma_A(i-j)$, $A(t)$ being an $AR(p)$ process and $\gamma_A(i-j)$ denoting the (i,j)th element of corresponding autocovariance matrix. $\Gamma_{\Psi^1\Psi^1}$ is $q_1 \times q_1$ matrix with its (i,j)th element as $\gamma_B(i-j)$, $B(t)$ being an $AR(q)$ process and $\gamma_B(i-j)$ denoting the (i,j)th element of corresponding autocovariance matrix. $\Gamma_{\Phi^1\Psi^1}$ is the covariance of $A(t)$ and $B(t)$. In an embodiment, similar definition follows for $\Gamma_2$.

In an embodiment, two ARMA structures $T_1$ and $T_2$ are used. For $T_1$, the variance matrix is $\Gamma_1^{-1}/n$, and for $T_1$, the variance matrix is $\Gamma_2^{-1}/p$ as known from some of the traditional systems and methods. Based upon the variance matrices of $T_1$ and $T_2$ and the regression equation (3), the variance of $f$ is as below:

$$\text{Var}(\xi) = \frac{I}{np} + \beta^T \text{Var}(\bar{\xi})\beta = \quad \text{equation (5)}$$

$$\frac{I}{np} + \beta^T \left( \begin{pmatrix} \Gamma_1^{-1}/n \\ \Gamma_2^{-1}/p \end{pmatrix} + \text{Cov}([\hat{\Phi}_1, \hat{\Psi}_1], [\hat{\Phi}_2, \hat{\Psi}_2])/np \right) \beta \approx$$

$$\beta^T \begin{pmatrix} \Gamma_1^{-1}/n \\ \Gamma_2^{-1}/p \end{pmatrix} \beta, \text{ since } np \to \infty.$$

Referring to equation (5) above, it may be noted that the statement regarding the variance is proved. The statement regarding mean follows from the least square estimates of $\beta$ which is $(\bar{\xi}^T \bar{\xi})^{-1} \bar{\xi}^T \xi$ that goes to 0 (since $\bar{\xi}\to 0$). Normality follows from known techniques in the art, for example, the central limit theorem and the properties of Gaussian errors.

The theorem shows that if the total number of steps (that is, np) for learning are large in number, then the predicted deviation goes to 0. Also, if the number of steps in each of the path-iteration and the number of path-iterations are large in number, then fluctuations in the predicted deviation gets condensed within a small region. This is because approximate variance is $$\beta^T \begin{pmatrix} \Gamma_1^{-1}/n \\ \Gamma_2^{-1}/p \end{pmatrix} \beta,$$

which shrinks as n and p both increase. Further, even if n remains fixed and p increases, the results holds because $np\to\infty$.

In an embodiment, the property that if n remains fixed and p increases, the results holds because $np\to\infty$ is a critical property because it shows that after a sufficiently large number of iterations of a path with a fixed number of steps, the variance, and thus, the predicted deviation gets bounded, and hence, the plot of the predicted deviations is like a funnel, as may be observed while referring to FIG. 4A through 6B. Thus, based upon the estimates of the time series parameters, it may be deduced what values of n and p (or what value of p for a fixed n) are required to make the $$\Gamma_1^{-1}/n$$

$$\Gamma_2^{-1}/p$$

part bounded with a pre-specified interval.

According to an embodiment of the present disclosure, experimental results achieved by implementing the two-stage modelling technique may be now be considered in detail. In an embodiment, an autonomous learning agent, that is, a robot was used to perform and implement the proposed methodology, wherein the autonomous learning agent is a Raspberry Pi 3 based robot with 512 MB of Random Access Memory (RAM). The robot was made to learn different paths, that is, a square path, a crisscross path, and a right-angle path, wherein large number of turns in each path imply more complexity in learning.

In an embodiment, multiple experiments were performed on each of the three paths, wherein first experiment was performed to test as to how the prediction behaves over an increasing number of learning iterations. Considering an example scenario, the square path is tested to be accurately learned and each step is accurately predicted after thirty-six iterations. The learning model may then be removed from the robot by the one or more hardware processors 104, so that the robot completely forgets navigations corresponding to the square path.

Figure 4A:
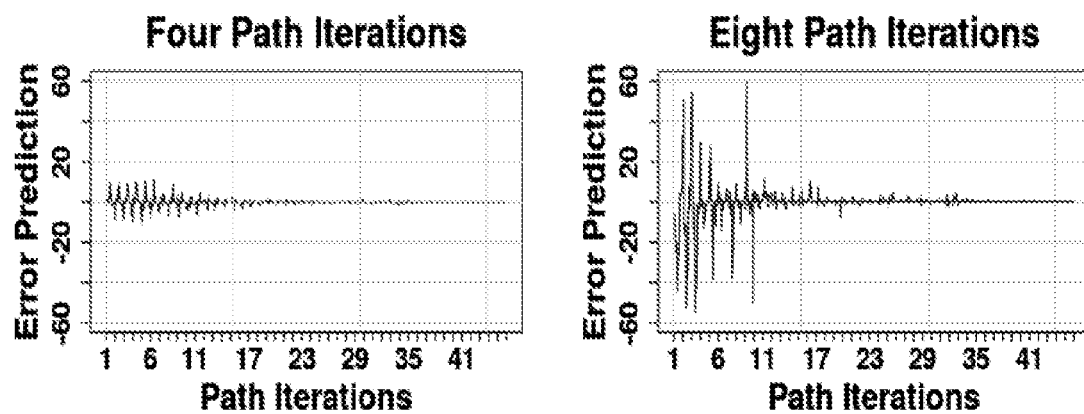
FIG. 4A through 6B illustrate graphical examples of prediction behaviors of the autonomous learning agent across a square path, a crisscross path, and a right-angle path by implementing a two-stage modelling technique, in accordance with some embodiments of the present disclosure.
Figure 4B:
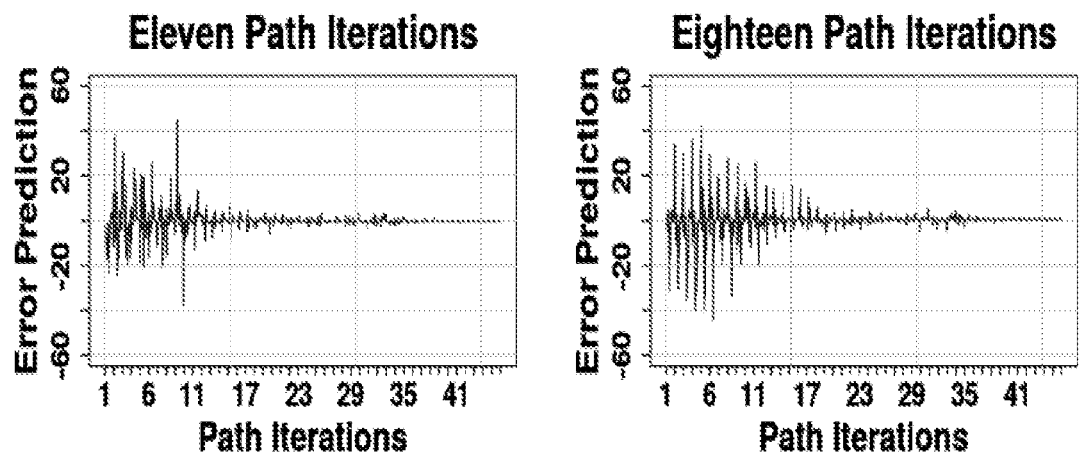
Figure 5A:
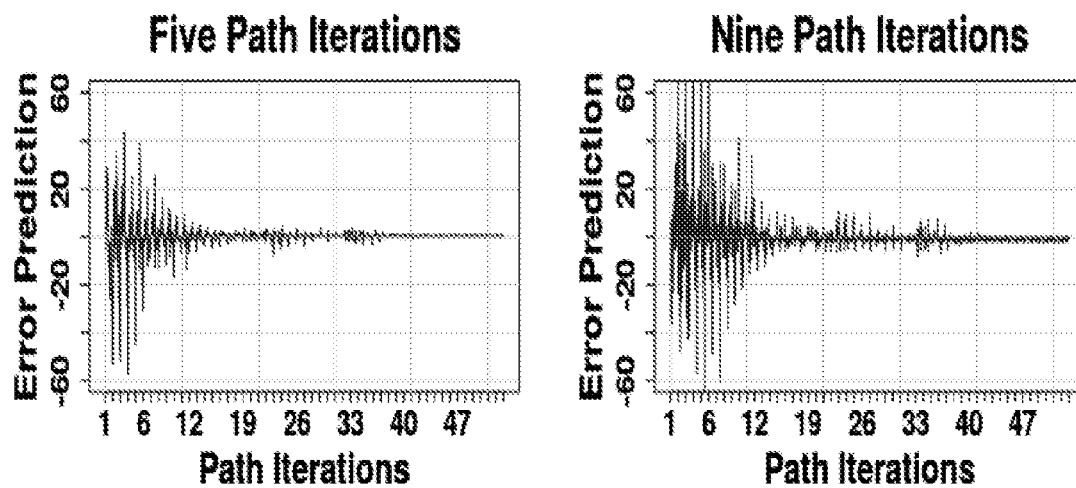
Figure 5B:
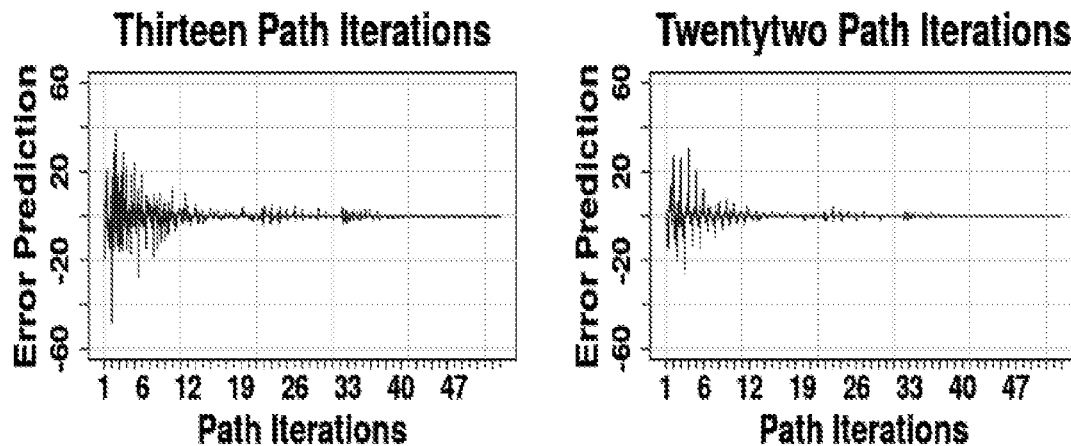
Figure 6A:
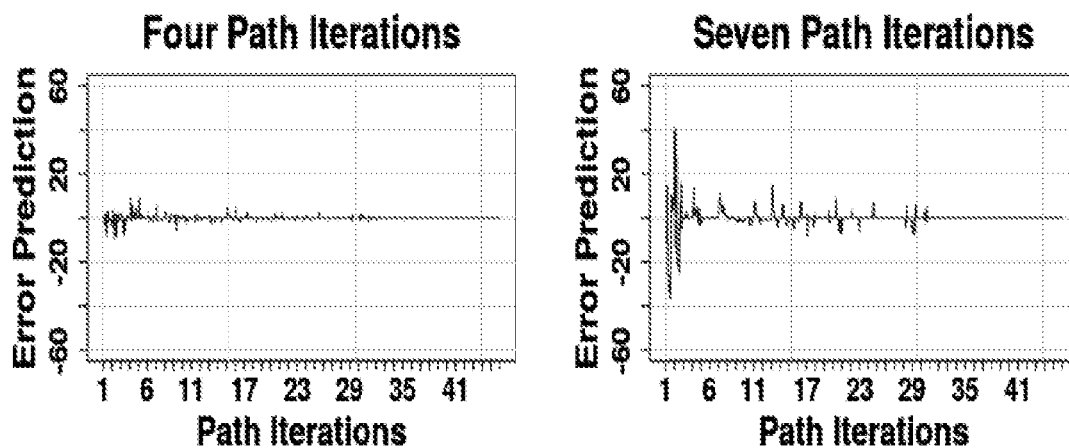
Figure 6B:
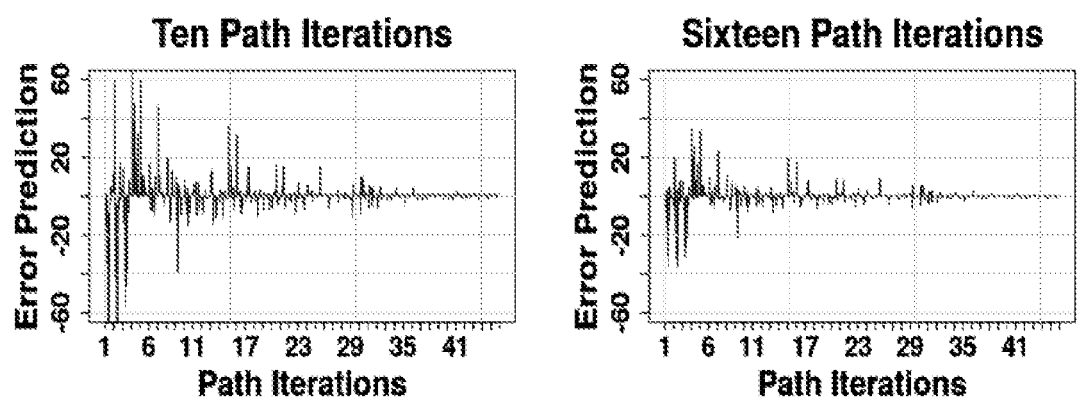

In an embodiment, the autonomous learning agent (or the robot) may then be trained with 4, 8, 11 and 18 path-iterations (that is, 10%, 20%, 30% and 50% of the saturation learning step respectively), and corresponding deviation prediction may be plotted against path-iterations. Referring to FIGS. 4A and 4B, it may be noted that for four training iterations, learning saturation is predicted to happen at around 40 path-iterations, while for 8 iterations it decreases to approximately 35 iterations. Thus, after 8 iterations, the one or more hardware processors 104 may, via the proposed methodology, predict the time by which the autonomous learning agent (or the robot) may learn the given path and also given a certain time for training how accurate will the autonomous learning agent (or the robot) be.

In an embodiment, similar experiment conducted with the crisscross and the right-angled paths, which may be learned after 44 and 32 path-iterations respectively, and the results may be observed by referring to FIG. 5A through 6B. Referring to FIG. 5A through 6B again, it may be noted that although the right-angled paths are more complex considering the number of turns, by implementing the proposed methodology, the HTM is able to learn quicker as the turns appear at regular intervals, as compared to the crisscross path.

Figure 7A:
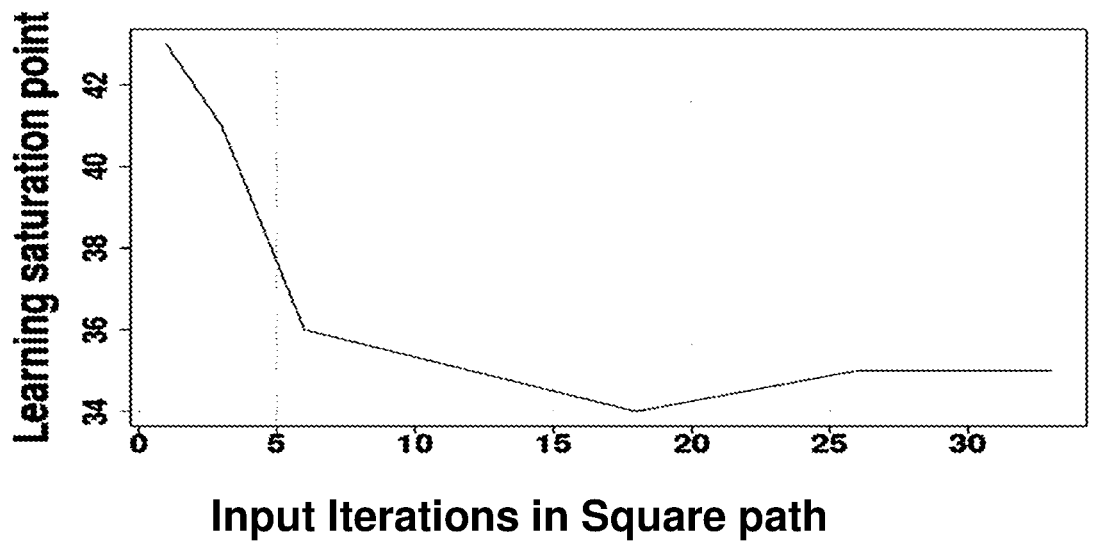
FIG. 7A through FIG. 7C illustrate a graphical representation of an example that when the number of path-iterations increase as an input, learning saturation point of the autonomous learning agent oscillates around a certain fixed value for a particular path, in accordance with some embodiments of the present disclosure.
Figure 7B:
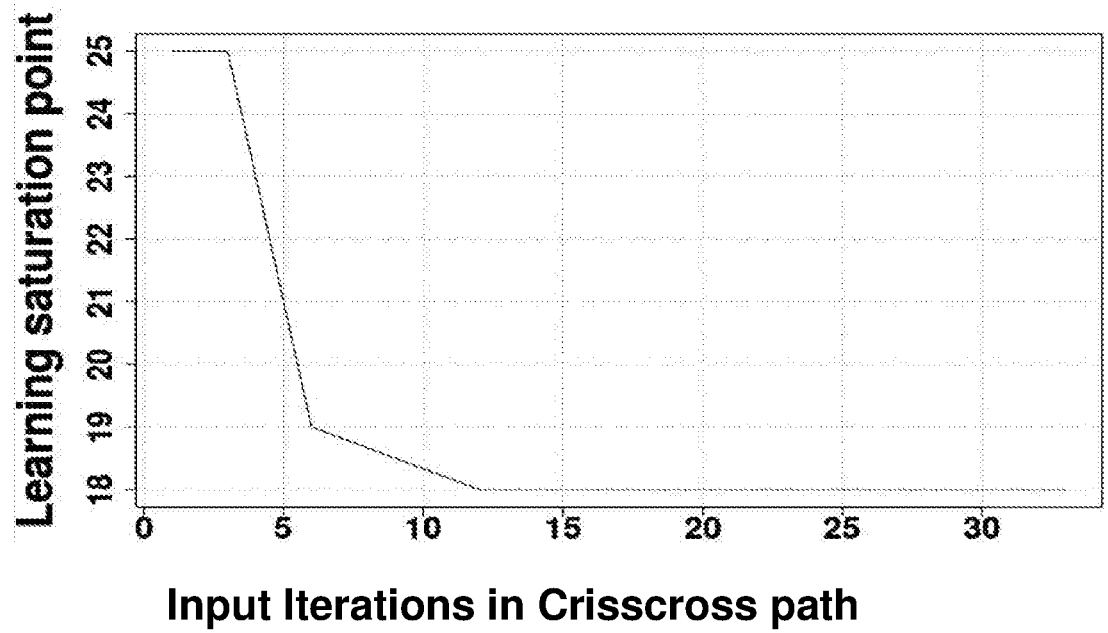
Figure 7C:
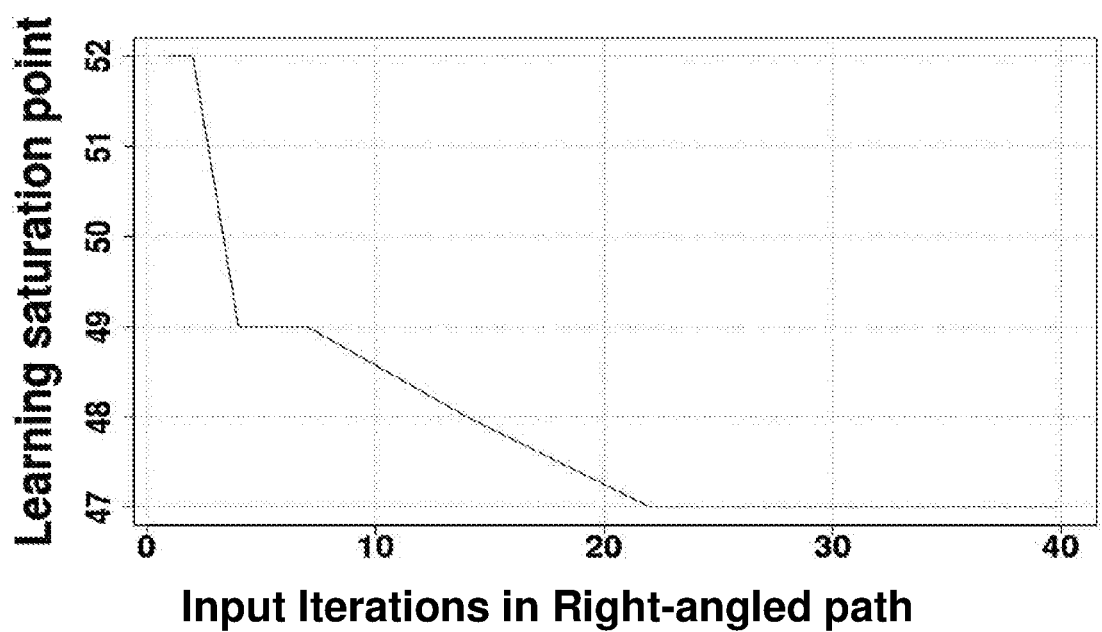

According to an embodiment of the present disclosure, referring to FIG. 7A through 7C, it may be noted that as the number of path-iterations increase as an input, the value of predicted iteration for convergence i.e. learning saturation point, oscillates around a certain fixed value for a particular path. For all the three paths (that is, the square, the crisscross, and the right-angled path), even if the number of path-iterations are increased, the deviation model converges around a band of that certain value. This means that the learning saturation point always tends to a certain value and it does not improves (or degrades) much after certain number of path-iterations.

Figure 8A:
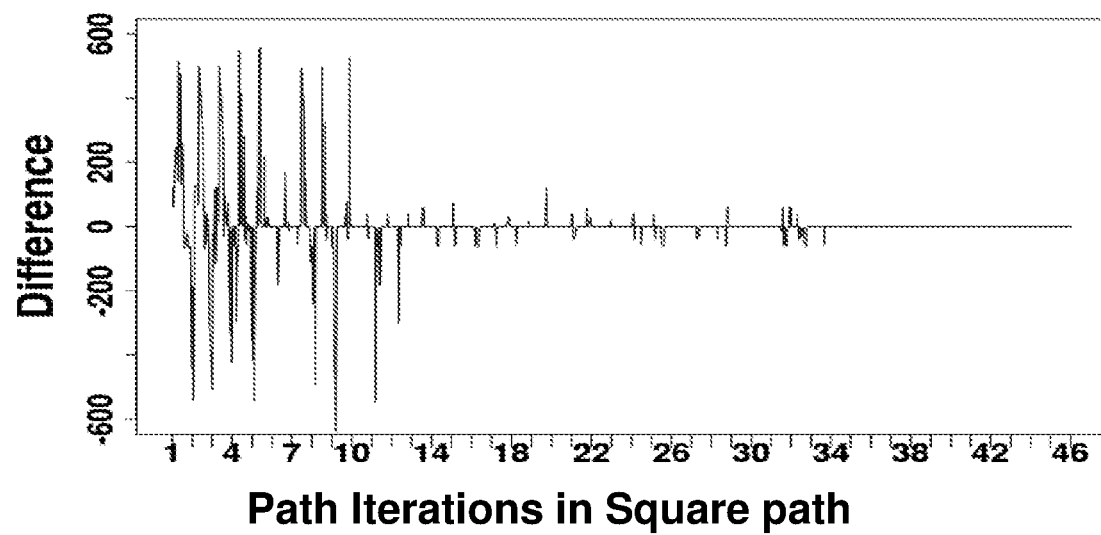
FIG. 8A through FIG. 8C illustrate a difference of prediction deviations between the proposed methodology and the traditional systems and methods, that is, the HTM, in accordance with some embodiments of the present disclosure.
Figure 8B:
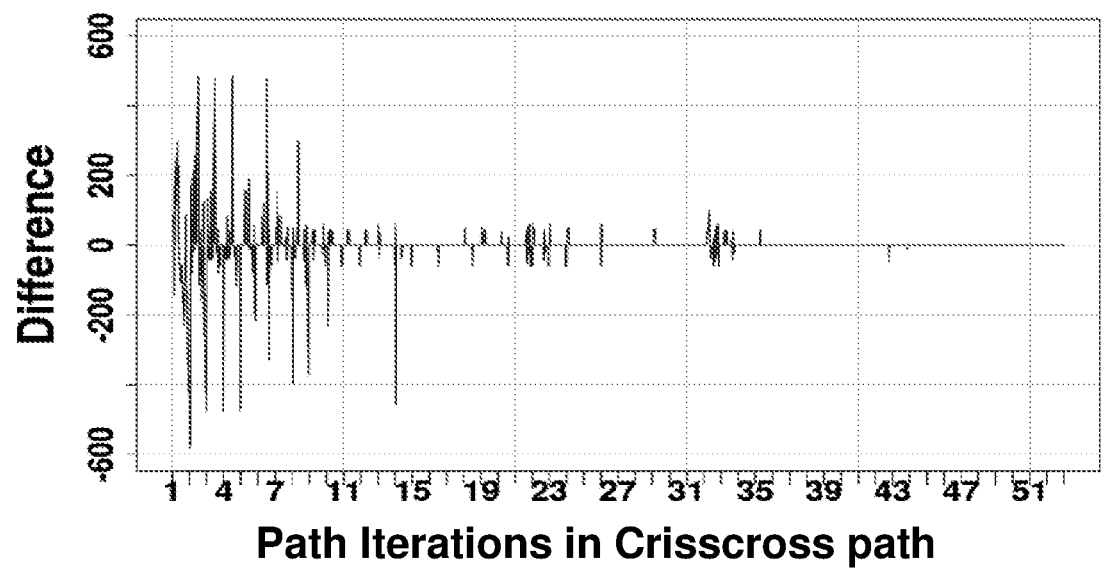
Figure 8C:
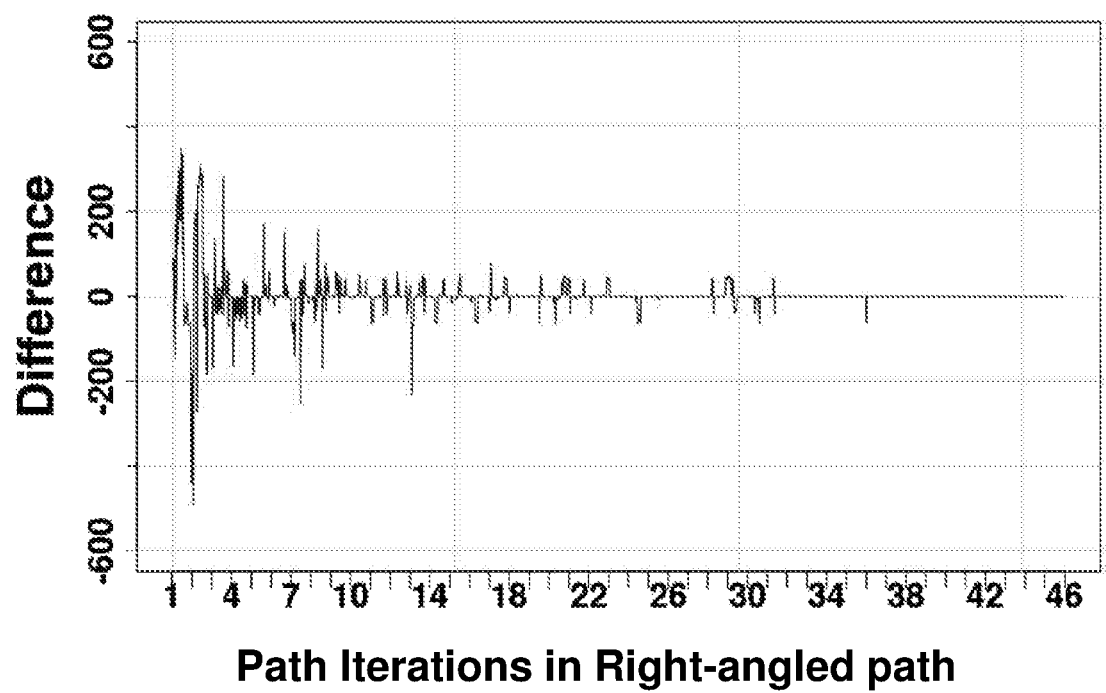

Referring to FIG. 8A through 8C, a difference of the prediction deviations by implementing the proposed methodology and the traditional systems and methods, that is, the HTM may be observed. Referring to FIG. 8A through 8C again, it may be noted that as the training iterations increase, the predictions modelled by implementing the proposed methodology converges with the HTM predictions.

According to an embodiment of the present disclosure, advantages of the proposed disclosure may now be considered in detail. Referring to FIG. 4A through 8C, it may be noted that the proposed methodology provides for a high accuracy in modelling the error in prediction. Referring to FIG. 8A through 8C again, it may be noted that the proposed methodology may be easily be integrated with the HTM, and thereby facilitates a new model that helps in reducing errors (or the prediction errors) in the HTM over a number of iterations. The proposed methodology takes all the errors in HTM as an input and facilitates an optimized model that determines how the prediction behavior changes over a number of iterations. None of the traditional systems and methods provide for modelling the prediction errors of the HTM.

Further, the traditional systems and methods (or existing learning systems) fail to provide for the two-stage time-series modelling, as well as the combination of the two-stage time-series modelling, as has been disclosed by the proposed methodology. As discussed above, the proposed methodology is able to accommodate both learning modalities, that is, when the autonomous learning agent learns within each of the path-iteration and across each of the path-iterations.

In an embodiment, the memory 102 can be configured to store any data that is associated with modelling the prediction errors in path-learning of the autonomous learning agent. In an embodiment, the information pertaining to the plurality of sequential actions, the one or more datasets derived, the set of prediction error values extracted, the plurality of fitted error values extracted, and modelling the probable deviation of the autonomous learning agent from each of the actual action etc. is stored in the memory 102. Further, all information (inputs, outputs and so on) pertaining to modelling the prediction errors in path-learning of the autonomous learning agent, may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of modelling the prediction errors in path-learning of the autonomous learning agent. The embodiment, thus provides for modelling the plurality of prediction errors in path-learning of the autonomous learning agent by extracting, from the set of prediction error values, the plurality of fitted error values corresponding to each of the plurality of predicted actions and actual actions by implementing the ARMA technique, and estimating, by implementing the linear regression technique on the plurality of fitted error values, the probable deviation of the autonomous learning agent from each of the actual action amongst the plurality of predicted and actual actions. Moreover, the embodiments herein further provides for the two-stage time-series modelling, as well as the combination of the two-stage time-series modelling, wherein all the prediction errors in the HTM are reduced over a number of iterations.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of modelling prediction errors in path-learning of an autonomous learning agent, the method comprising a processor implemented steps of:
  capturing, by one or more hardware processors, a plurality of sequential actions depicting a pattern of time series via a two-stage modelling technique, wherein each of the plurality of sequential actions corresponds to the autonomous learning agent; wherein the autonomous learning agent is a robot that operates on an owner's behalf without interference of the owner, wherein the robot learns a square path, a crisscross path, and a right-angle path and wherein two-stage time series models of the two-stage modelling technique comprises:
    (i) time series model within each path-iteration of the path-learning of the autonomous learning agent represented as $T_1$; and
    (ii) time series model across all path-iterations of the path-learning of the autonomous learning agent represented as $T_2$,
  wherein the two-stage time series models of the two-stage modelling technique are represented as: $e_{ij}=C+\beta_1 [\Sigma_{k=1}^{p1}\hat{\phi}_k^1 e_{i-k,j}+\Sigma_{k=1}^{q1}\hat{\Psi}_i^1 \varepsilon_{i-k,\cdot}^1]+\beta_2[\Sigma_{k=1}^{p2}\hat{\phi}_k^2 e_{i,j-k}+\Sigma_{k=1}^{q2}\hat{\Psi}_i^2 \varepsilon_{\cdot,j-k}^2]+\varepsilon_{ij}$, wherein $\hat{\phi}^1$ and $\hat{\phi}^2$ denote estimated autoregressive parameters of the time series models $T_1$ and $T_2$ respectively and $\hat{\Psi}^1$ and $\hat{\Psi}^2$ denote estimated moving-average parameters of $T_1$ and $T_2$ respectively and $\varepsilon^1$ and $\varepsilon^2$ are errors attached to $T_1$ and $T_2$ respectively and $\varepsilon$ is a Gaussian noise with mean 0 and variance 1;
  and wherein, after a predefined number of path-iterations in the square path, the crisscross path, and the right-angle path, a value of a learning saturation point of the autonomous learning agent oscillates around a fixed value for that particular path, wherein the value of the learning saturation point corresponds to a value of predicted iteration for convergence so that even if the number of path-iterations are increased, the deviation converges around the fixed value for the particular path;
  deriving, based upon the plurality of sequential actions captured, one or more datasets comprising a plurality of predicted and actual actions of the autonomous learning agent by a Hierarchical Temporal Memory (HTM) modelling technique, wherein the plurality of sequential actions comprise plurality of parallel or sequential elementary actions and an each elementary action comprises a single or a plurality of parallel elementary operations characterized by a primitive senso-motoric operation for degree of freedom (DOF) of the robot and wherein the plurality of sequential actions comprises turning left, turning right, moving forward by the autonomous learning agent, wherein the plurality of sequential actions is represented by a sequence for execution of tasks or sub-tasks and depicts the pattern of time series as learning and prediction of the autonomous learning agent evolves and become accurate;
  extracting, using each of the plurality of predicted and actual actions, a set of prediction error values by a Euclidean Distance technique, wherein each of the set of prediction error values comprises a deviation from one or more actual actions amongst the plurality of predicted and actual actions, wherein actual actions refer to actual step taken by the autonomous learning agent and wherein each actual action amongst the plurality of predicted and actual actions results in a movement of the autonomous learning agent to a position on the path which is denoted by $(x_{act}, y_{act})$ and predicted action refers to an action of the autonomous learning agent predicted by the HTM modelling technique; and
  modelling using the two-stage modelling technique implemented to capture a plurality of learning modalities across the path-learning of the autonomous learning agent, based upon the set of prediction error values, and a plurality of prediction errors in the path-learning of the autonomous learning agent, wherein the two-stage modelling is performed across and within each path-iteration of the path-learning by implementing an Autoregressive moving average (ARMA) technique, wherein as the path-iterations increase, the predicted actions modelled by the two-stage modelling technique converge with the predicted actions derived by the HTM, thereby facilitating in reducing errors and increasing accuracy in the prediction of errors in the path-learning of the autonomous learning agent, and wherein the two-stage modelling comprises:
    (i) extracting, from the set of prediction error values, a plurality of fitted error values corresponding to each of the plurality of predicted actions and actual actions by implementing the Autoregressive moving average (ARMA) technique on the set of prediction error values; and
    (ii) estimating, by implementing a linear regression technique on the plurality of fitted error values, a probable deviation of the autonomous learning agent from each of an actual action amongst the plurality of predicted and actual actions; and
  wherein the two-stage time series models are integrated via the linear regression technique for estimating the probable deviation of the autonomous learning agent and wherein the plurality of learning modalities comprise a learning from one or more preceding steps within a path and a learning from one or more preceding iterations across each path iteration by the autonomous learning agent, wherein the learnt path is removed from the autonomous learning agent by the one or more hardware processors once the learnt path is tested as accurately learnt and each step of the learnt path is accurately predicted, so that the autonomous learning agent completely forgets navigations corresponding to that learnt path.

2. A system for modelling prediction errors in path-learning of an autonomous learning agent, the system comprising:

a memory storing instructions;
one or more communication interfaces; and
one or more hardware processors coupled to the memory via the one or more communication interfaces, wherein the one or more hardware processors are configured by the instructions to:
capture, a plurality of sequential actions depicting a pattern of time series via a two-stage modelling technique, wherein each of the plurality of sequential actions corresponds to the autonomous learning agent, wherein the autonomous learning agent is a robot that operates on an owner's behalf without interference of the owner, wherein the robot learns a square path, a crisscross path, and a right-angle path and wherein two stage time series models of the two-stage modelling technique comprises:
(i) time series model within each path-iteration of the path-learning of the autonomous learning agent represented as $T_1$; and
(ii) time series model across all path-iterations of the path-learning of the autonomous learning agent represented as $T_2$;
wherein the two stage time series models of the two-stage modelling technique are represented as:
$e_{ij} = C + \beta_1 [\sum_{k=1}^{p1} \hat{\phi}_k^1 e_i - k, j + \sum_{k=1}^{q1} \hat{\Psi}_i^1 \varepsilon_{i-k,.}^1 ] + \beta_2 [\sum_{k=1}^{p2} \hat{\phi}_k^2 e_i, j-k, + \sum_{k=1}^{q2} \hat{\Psi}_i^2 \varepsilon_{.,j-k}^2 ] + \varepsilon_{ij}$, wherein $\hat{\phi}^1$ and $\hat{\phi}^2$ denote estimated autoregressive parameters of the time series models $T_1$ and $T_2$ respectively and $\hat{\Psi}^1$ and $\hat{\Psi}^2$ denote estimated moving-average parameters of $T_1$ and $T_2$ respectively and $\varepsilon^1$ and $\varepsilon^2$ are errors attached to $T_1$ and $T_2$ respectively and $\varepsilon$ is a Gaussian noise with mean 0 and variance 1;
and wherein, after a predefined number of path-iterations, in the square path, the crisscross path, and the right-angle path, a value of a learning saturation point of the autonomous learning agent, oscillates around a fixed value for a particular path, wherein the value of the learning saturation point corresponds to a value of predicted iteration for convergence so that even if the number of path-iterations are increased, the deviation converges around the fixed value for the particular path;
derive, based upon the plurality of sequential actions captured, one or more datasets comprising a plurality of predicted and actual actions of the autonomous learning agent by a Hierarchical Temporal Memory modelling (HTM) technique, wherein the plurality of sequential actions comprise plurality of parallel or sequential elementary actions and an each elementary action comprises a single or a plurality of parallel elementary operations characterized by a primitive senso-motoric operation for degree of freedom (DOF) of the robot and wherein the plurality of sequential actions comprises turning left, turning right, moving forward by the autonomous learning agent, wherein the plurality of sequential actions is represented by a sequence for execution of tasks or sub-tasks and depicts the pattern of time series as learning and prediction of the autonomous learning agent evolves and become accurate;
extract, using each of the plurality of predicted and actual actions, a set of prediction error values by a Euclidean Distance technique, wherein each of the set of prediction error values comprises a deviation from one or more actual actions amongst the plurality of predicted and actual actions, wherein actual actions refer to actual step taken by the autonomous learning agent and wherein each actual action amongst the plurality of predicted and actual actions results in a movement of the autonomous learning agent to a position on the path which is denoted by $(x_{act}, y_{act})$ and predicted action refers to an action of the autonomous learning agent predicted by the HTM modelling technique; and
model using the two-stage modelling technique implemented to capture a plurality of learning modalities across the path-learning of the autonomous learning agent, based upon the set of prediction error values, and a plurality of prediction errors in the path-learning of the autonomous learning agent, wherein the two-stage modelling is performed across and within each path-iteration of the path-learning by implementing an Autoregressive moving average (ARMA) technique, wherein as the path-iterations increase, the predicted actions modelled by the two-stage modelling technique converge with the predicted actions derived by the HTM, thereby facilitating in reducing errors and increasing accuracy in prediction of errors in the path-learning of the autonomous learning agent, and wherein the two-stage modelling comprises:
(i) extract, from the set of prediction error values, a plurality of fitted error values corresponding to each of the plurality of predicted actions and actual actions by implementing the Autoregressive moving average (ARMA) technique on the set of prediction error values; and
(ii) estimate, by implementing a linear regression technique on the plurality of fitted error values, a probable deviation of the autonomous learning agent from each of an actual action amongst the plurality of predicted and actual actions, and
wherein the two-stage time series models integrated via the linear regression technique for estimating the probable deviation of the autonomous learning agent and wherein the plurality of learning modalities comprise a learning from one or more preceding steps within a path and a learning from one or more preceding iterations across each path iteration by the autonomous learning agent,
wherein the learnt path is removed from the autonomous learning agent by the one or more hardware processors once the learnt path is tested as accurately learnt and each step of the learnt path is accurately predicted, so that the autonomous learning agent completely forgets navigations corresponding to that learnt path.

3. A computer program product comprising a non-transitory computer readable medium having a computer readable program embodied therein, wherein the computer readable program, when executed on a computing device, causes the computing device to:
- capture, by one or more hardware processors, a plurality of sequential actions depicting a pattern of time series via a two-stage modelling technique, wherein each of the plurality of sequential actions corresponds to the autonomous learning agent, wherein the autonomous learning agent is a robot that operates on an owner's behalf without interference of the owner, wherein the robot learns a square path, a crisscross path, and a right-angle path and wherein two-stage time series models of the two-stage modelling technique comprises:
  - (iii) time series model within each path-iteration of the path-learning of the autonomous learning agent represented as $T_1$; and
  - (iv) time series model across all path-iterations of the path-learning of the autonomous learning agent represented as $T_2$;
    - wherein the two-stage time series models of the two-stage modelling technique are represented as: $e_{ij}=C+\beta_1[\Sigma_{k=1}^{p1}\hat{\phi}_k^1 e_i-k,j+\Sigma_{k=1}^{q1}\hat{\Psi}_i^1 \varepsilon_{i-k,.}^1.]+\beta_2 [\Sigma_{k=1}^{p2}\hat{\phi}_k^2 e_i j-k,+\Sigma_{k=1}^{q2}\hat{\Psi}_i^2 \varepsilon_{.,j-k}^2]+\varepsilon_{ij}$, wherein $\hat{\phi}^1$ and $\hat{\phi}^2$ denote estimated autoregressive parameters of the time series models $T_1$ and $T_2$ respectively and $\hat{\Psi}^1$ and $\hat{\Psi}^2$ denote estimated moving-average parameters of $T_1$ and $T_2$ respectively and $\varepsilon^1$ and $\varepsilon^2$ are errors attached to $T_1$ and $T_2$ respectively and $\varepsilon$ is a Gaussian noise with mean 0 and variance 1;
    - and wherein, after a predefined number of path-iterations in the square path, the crisscross path, and the right-angle path, a value of a learning saturation point of the autonomous learning agent oscillates around a fixed value for a particular path, wherein the value of the learning saturation point corresponds to a value of predicted iteration for convergence so that even if the number of path-iterations are increased, the deviation converges around the fixed value for the particular path;
- derive, based upon the plurality of sequential actions captured, one or more datasets comprising a plurality of predicted and actual actions of the autonomous learning agent by a Hierarchical Temporal Memory (HTM) modelling technique, wherein the plurality of sequential actions comprise plurality of parallel or sequential elementary actions and an each elementary action comprises a single or a plurality of parallel elementary operations characterized by a primitive senso-motoric operation for degree of freedom (DOF) of the robot and wherein the plurality of sequential actions comprises turning left, turning right, moving forward by the autonomous learning agent, wherein the plurality of sequential actions is represented by a sequence for execution of tasks or sub-tasks and depicts the pattern of time series as learning and prediction of the autonomous learning agent evolves and become accurate;
- extract, using each of the plurality of predicted and actual actions, a set of prediction error values by a Euclidean Distance technique, wherein each of the set of prediction error values comprises a deviation from one or more actual actions amongst the plurality of predicted and actual actions, wherein actual actions refer to actual step taken by the autonomous learning agent and wherein each actual action amongst the plurality of predicted and actual actions results in a movement of the autonomous learning agent to a position on the path which is denoted by ($x_{act}$, $y_{act}$) and predicted action refers to an action of the autonomous learning agent predicted by the HTM modelling technique; and
- model using the two-stage modelling technique implemented to capture a plurality of learning modalities across the path-learning of the autonomous learning agent, based upon the set of prediction error values, and a plurality of prediction errors in the path-learning of the autonomous learning agent, wherein the two-stage modelling is performed across and within each path-iteration of the path-learning by implementing an Autoregressive moving average (ARMA) technique, wherein as the path-iterations increase, the predicted actions modelled by the two-stage modelling technique converge with the predicted actions derived by the HTM, thereby facilitating in reducing errors and increasing accuracy in prediction of errors in the path-learning of the autonomous learning agent, and wherein the two-stage modelling comprises:
  - (iii) extracting, from the set of prediction error values, a plurality of fitted error values corresponding to each of the plurality of predicted actions and actual actions by implementing an Autoregressive moving average (ARMA) technique on the set of prediction error values; and
  - (iv) estimating, by implementing a linear regression technique on the plurality of fitted error values, a probable deviation of the autonomous learning agent from each of an actual action amongst the plurality of predicted and actual actions; and
- wherein the two-stage time series models integrated via the linear regression technique for estimating the probable deviation of the autonomous learning agent and wherein the plurality of learning modalities comprise a learning from one or more preceding step steps within a path and a learning from one or more preceding iteration iterations across each path iteration by the autonomous learning agent,
  - wherein the learnt path is removed from the autonomous learning agent by the one or more hardware processors once the learnt path is tested as accurately learnt and each step of the learnt path is accurately predicted, so that the autonomous learning agent completely forgets navigations corresponding to that learnt path.

* * * * *